United States Patent
Briggs et al.

(10) Patent No.: US 10,226,056 B2
(45) Date of Patent: Mar. 12, 2019

(54) DURABLE ASYMMETRIC COMPOSITE MEMBRANE

(71) Applicant: HYDROXSYS HOLDINGS LIMITED, Auckland (NZ)

(72) Inventors: Daryl Joseph Briggs, Auckland (NZ); Lenka Benacek Craft, Auckland (NZ); Ashveen Vikash Nand, Auckland (NZ)

(73) Assignee: HYDROXSYS HOLDINGS LIMITED, Auckland (NZ)

( * ) Notice: Subject to any disclaimer, the term of this patent is extended or adjusted under 35 U.S.C. 154(b) by 315 days.

(21) Appl. No.: 15/271,923

(22) Filed: Sep. 21, 2016

(65) Prior Publication Data

US 2017/0086469 A1    Mar. 30, 2017

Related U.S. Application Data

(63) Continuation of application No. PCT/NZ2015/050034, filed on Mar. 26, 2015.

(30) Foreign Application Priority Data

Mar. 26, 2014  (AU) ................................ 2014901077
Mar. 26, 2014  (AU) ................................ 2014901078

(51) Int. Cl.
*H01M 2/14* (2006.01)
*H01M 2/16* (2006.01)
(Continued)

(52) U.S. Cl.
CPC .............. *A23C 9/142* (2013.01); *B01D 69/12* (2013.01); *B01D 69/125* (2013.01); *B01D 71/26* (2013.01);
(Continued)

(58) Field of Classification Search
None
See application file for complete search history.

(56) References Cited

U.S. PATENT DOCUMENTS

| | | | |
|---|---|---|---|
| 9,643,153 B2 * | 5/2017 | Meier | B01J 31/4061 |
| 2014/0157985 A1 * | 6/2014 | Scovazzo | B01D 53/22 95/52 |

FOREIGN PATENT DOCUMENTS

| WO | WO 2002/085500 A1 | 10/2002 |
|---|---|---|
| WO | WO 2005/120701 A1 | 12/2005 |
| WO | WO 2010/106021 A1 | 9/2010 |

OTHER PUBLICATIONS

He, T., et al; "Preparation and characterization of nanofiltration membranes by coating polyethersulfone hollow fibers with sulfonated poly(ether ether ketone) (SPEEK)," *Journal of Membrane Science*, vol. 307, pp. 62-72 (2008) Abstract; Sections 2.4, 3.2 & 3.4.

Rhoden, Stephen L.N.H., et al; "Low equivalent weight Friedel-Crafts cross-linked sulfonated poly(ether ether ketone)," *Journal of Membrane Science*, vol. 376, pp. 290-301 (2011) Sections 2.2, 2.3 & 3.2; Scheme 1.

Luo, H., et al; "Double cross-linked polyetheretherketone proton exchange membrane for fuel cell"; *International Journal of Hydrogen Energy*, vol. 37, pp. 6148-6152 (2012) Section 2.2; Figure 1.
(Continued)

*Primary Examiner* — Krishnan S Menon

(74) *Attorney, Agent, or Firm* — Nixon & Vanderhye P.C.

(57) ABSTRACT

Durable asymmetric composite membranes consisting of a film of cross-linked sulfonated poly(ether ether ketone) adhered to a sheet of sulfonated microporous poly(ethylene) are disclosed. The membranes have application in the recovery of water from feed streams were the ability to clean in situ is desirable, for example in dairy processing. Methods of preparing cross-linked sulfonated poly(ether ether ketone) suitable for use as a rejection layer in such membranes are also disclosed.

16 Claims, 12 Drawing Sheets

(51) Int. Cl.
*A23C 9/142* (2006.01)
*B01D 69/12* (2006.01)
*B01D 71/26* (2006.01)
*B01D 71/52* (2006.01)
*B01D 71/82* (2006.01)
*C02F 1/44* (2006.01)

(52) U.S. Cl.
CPC .............. *B01D 71/52* (2013.01); *B01D 71/82* (2013.01); *C02F 1/44* (2013.01); *B01D 2323/30* (2013.01); *B01D 2325/04* (2013.01); *H01M 2/145* (2013.01); *H01M 2/1686* (2013.01)

(56) References Cited

OTHER PUBLICATIONS

He, T., et al; "Preparation and characterization of nanofiltration membranes by coating polyethersulfone hollow fibers with sulfonated poly(ether ether ketone) (SPEEK),"; *J Membrane Sci.*, vol. 307, pp. 62-72 (2008) Abstract; Sections 2.4, 3.2 & 3.4.

Rhoden, S.L. N.H., et al; "Low equivalent weight Friedel-Crafts cross-linked sulfonated poly(ether ether ketone)," *J. Membrane Sci.*, vol. 376, pp. 290-301 (2011) Sections 2.2, 2.3 & 3.2; Scheme 1.

Luo, H., et al; "Double cross-linked polyetheretherketone proton exchange membrane for fuel cell"; *Int. J. Hydrogen Energ.*, vol. 37, pp. 6148-6152 (2012) Section 2.2; Figure 1.

\* cited by examiner

DURABLE ASYMMETRIC COMPOSITE MEMBRANE

This application is a continuation of PCT International Application No. PCT/NZ2015/050034, filed Mar. 26, 2015, which claims priority to Australian Patent Application Nos. 2014901077, filed Mar. 26, 2014, and 2014901078, filed Mar. 26, 2014, the entire contents of each of which are hereby incorporated by reference.

FIELD OF INVENTION

The invention relates to the preparation and use of cross-linked poly(ether ether ketone) as a rejection layer in durable asymmetric composite membranes. In particular, the invention relates to membranes comprising cross-linked poly (ether ether ketone) as a rejection layer and sulfonated microporous poly(ethylene) as a support layer and the use of such membranes for the recovery of water from feed streams such as dairy feed streams.

BACKGROUND ART

Sulfonated poly(ether ether ketone) membranes have greater hydrophilicity relative to membranes prepared from the parent polymer, but are subject to excessive swelling and dimensional instability when wetted. In the context of preparing membranes for use as separators in batteries and fuel cells crosslinking of sulfonated poly(ether ether ketone) has been pursued as a means of overcoming this deficiency. The publication of Hou et al (2012) reviews methods of cross-linking of sulfonated aromatic polymers that have been pursued in the context of developing PEMs. Many of these methods exploit the reactivity provided by the presence of the sulfonic acid group.

The publications of Mikhailenko et al (2004), Mikhailenko et al (2006), Deb et al (2007) and Hande et al (2008) disclose methods where a condensation reaction between the sulfonic acid of the sulfonated aromatic polymer and the hydroxyl group of an alcohol forms a sulfonic acid ester linkage. These methods effectively lower the degree of sulfonation (DS) of the substrate polymer. The publications of Mikhailenko et al (2004 and 2006) disclose polymer electrolyte membranes prepared from sulfonated poly(ether ether ketone) and simple polyols. Structural data indicated that under the conditions used simple polyols such as ethylene glycol and glycerol do not link the neighbouring main chains of the polymer via the sulfonic acid functions, but form an interpenetrating network of oligomers bonded to the sulfonyl ($SO_3$) group. As a major proportion of the sulfonic acid functions are not involved in this form of "cross-linking", membrane conductivities are only somewhat reduced.

The publication of Rhoden et al (2011) discloses a method of cross-linking a sulfonated poly(ether ether ketone) with a high degree of sulfonation using 1,4-benzene dimethanol. The method is a zinc chloride catalysed crosslinking that is stated to produce a high hydrophobic polymer backbone, whilst still maintaining high levels of polymer sulfonation. The method is distinguished from those disclosed in the publications of Mikhailenko et al (2004), Mikhailenko et al (2006), Deb et al (2007) and Hande et al (2008) in that the sulfonic acid group does not participate directly in the reaction resulting in the formation of the cross-link. The reaction is performed in an aqueous solution of SPEEK.

The publication of Di Vona et al (2008) discloses sulfonation in the preparation of proton-conducting hybrid polymers based on poly(ether ether ketone). The use of both sulfuric acid and chlorosulfonic acid as the sulfonating agent is disclosed.

The publication of Hande et al (2008) discloses the crosslinking of sulfonated poly(ether ether ketone) in the preparation of proton exchange membranes using 2,6-bis (hydroxymethyl)-4-methyl phenol and 1,4-bis(hydroxymethyl) benzene as the cross-linking agents. The crosslinking reaction was achieved by a thermally activated condensation reaction between the hydroxymethyl group of the cross-linking agent and the sulfonic acid group of the polymer.

The publication of Di Vona et al (2009) discloses thermally induced crosslinking of sulfonated poly(ether ether ketone) by the formation of $SO_2$ bridges between macromolecular chains. The publication also discloses the important role played by the casting solvent when seeking to improve the proton-exchange membranes used in fuel cells.

The publication of Ye et al (2009) discloses the use of benzoxazine or sulfonic acid containing benzoxazine as a crosslinking agent in the preparation of sulfonated poly (ether ether ketone) proton exchange membranes. The cast membranes are heated at 180° C. for three hours to complete the crosslinking.

The publication of Merle et al (2014) also discloses the preparation of crosslinked sulfonated poly(ether ether ketone) membranes where crosslinking was performed via the Friedel-Crafts route employing 1,4-benezene dimethanol as the cross-linking agent. High proton conductive membranes were obtained at increased temperatures.

In the context of preparing membranes for use as separators in batteries and fuel cells the objective is to prepare a membrane that permits the passage of ions whilst maintaining the separation of the two electrodes. By contrast, in the context of preparing membranes for use in processes driven by hydrostatic or osmotic pressure, the objective is to prepare a membrane that permits the passage of water whilst limiting the passage of solutes. In food processing the membrane is also required to be chemically resistant and durable.

Osmosis is generally seen as the movement of water from a solution of higher water chemical potential to one of lower water chemical potential. This movement, or flux, is moderated by a semi-permeable membrane, which allows the passage of water, but not the passage of the species whose presence lowers the chemical potential of water in the receiving solution. This fundamental thermodynamic property of solutions is an essential component of many biological processes (McCutcheon and Wang (2013)).

The first viable semi-permeable membrane was made in the 1960s from cellulose acetate and used in reverse osmosis (Loeb (1981)). The further development of thin film composite membranes followed with the introduction of the concept of interfacial polymerisation (Mogan (1965)). In a thin film composite membrane, each individual layer can be optimised for its particular function. The thin "barrier layer" can be optimised for the desired combination of solvent flux and solute rejection, while the porous "support layer" can be optimised for maximum strength and compression resistance combined with minimum resistance to permeate flow. Numerous reviews concerning the preparation and properties of composite membranes developed for use in reverse osmosis and nanofiltration are available (e.g. Petersen (1993)).

The desired properties of membranes used in water desalination, purification or recovery include high rejection of undesirable species, high filtration rate and good mechanical strength. Depending on the particular application on which the membrane is used other desired properties may also include resistance to fouling and chemical decomposition (McCutcheon and Wang (2013)). These latter properties are particularly desirable for membranes used in food processing applications such as dairy processing operations where periodic in situ cleaning and sterilisation of the membrane is required.

It is an object of the present invention to provide at least one method of preparing cross-linked poly(ether ether ketone) suitable for use as the rejection layer of an asymmetric composite membrane. It is an object of the present invention to provide an asymmetric composite membrane suitable for use in the recovery of water from dairy feed streams. It is an object of the present invention to provide a durable asymmetric composite membrane. It is an object of the present invention at least to provide a useful choice in the selection of an asymmetric composite membrane. These objects are to be read in the alternative.

STATEMENT OF INVENTION

In a first aspect the invention provides an asymmetric composite membrane comprising a first layer of cross-linked sulfonated poly(ether ether ketone) adhered to a second layer of sulfonated microporous poly(ethylene).

Preferably, the thickness of the first layer is in the range 0.1 to 50 µM and the thickness of the second layer is in the range 5 to 200 µM. More preferably, the thickness of the first layer is in the range 1 to 5 µM and the thickness of the second layer is in the range 5 to 20 µM. Most preferably, the thickness of the first layer is 1 µM and the thickness of the second layer is 20 µM.

Preferably, the crosslinking agent of the cross-linked sulfonated poly(ether ether ketone) is a $C_{2-6}$-dicarboxylic cross-linking agent. More preferably, the $C_{2-6}$-dicarboxylic cross-linking agent is selected from the group consisting of: ethanedioic acid (oxalic acid; CAS Registry no. 144-62-7), 2-hydroxypropanedioic acid (CAS Registry no. 80-69-3); 2,3-dihydroxybutanedioic acid and 2-hydroxy-1,2,3-propanetricarboxylic acid (citric acid; CAS Registry no. 77-92-9). Most preferably, the $C_{2-6}$-dicarboxylic cross-linking agent is 2-hydroxy-1,2,3-propanetricarboxylic acid (citric acid; CAS Registry no. 77-92-9).

Preferably, the asymmetric composite membrane excludes a woven or non-woven fabric.

In a second aspect the invention provides a method of removing water from a feed stream comprising the step of exposing the first layer of the asymmetric composite membrane of the first aspect of the invention to the feed stream at a pressure and temperature sufficient to produce a permeate.

Preferably, the feed stream is a dairy product. More preferably, the feed stream is milk. Most preferably, the feed stream is skimmed milk.

Preferably, the pressure is in the range 10 to 50 Bar. More preferably, the pressure is in the range 20 to 40 Bar. Most preferably, the pressure is in the range 20 to 30 Bar.

Preferably, the temperature is in the range 2 to 98° C. More preferably, the temperature is in the range 4 to 40° C. Most preferably, the temperature is in the range 4 to 20° C.

In a third aspect the invention provides a method of preparing a cross-linked sulfonated poly(ether ether ketone) comprising the step of incubating in the presence of a Friedel-Crafts type catalyst a mixture of a chlorosulfonated poly(ether ether ketone) and a $C_{2-6}$-dioic cross-linking agent solvated in a non-aqueous reactive solvent at a temperature substantially below 120° C. for a time sufficient to provide the cross-linked sulfonated poly(ether ether ketone).

Preferably, the Friedel-Crafts type catalyst is ferric chloride ($FeCl_3$).

Preferably, the $C_{2-6}$-dioic cross-linking agent is selected from the group consisting of: ethanedioic acid (oxalic acid; CAS Registry no. 144-62-7), 2-hydroxypropanedioic acid (CAS Registry no. 80-69-3); 2,3-dihydroxybutanedioic acid and 2-hydroxy-1,2,3-propanetricarboxylic acid (citric acid; CAS Registry no. 77-92-9). More preferably, the $C_{2-6}$-dioic cross-linking agent is selected from the group consisting of: ethanedioic acid (oxalic acid; CAS Registry no. 144-62-7); (2R,3R)-2,3-dihydroxybutanedioic acid (tartaric acid; CAS Registry no. 87-69-4) and 2-hydroxy-1,2,3-propanetricarboxylic acid (citric acid; CAS Registry no. 77-92-9).

Preferably, the non-aqueous reactive solvent is a carbonic solvent. More preferably, the non-aqueous reactive solvent is a ketonic solvent. Yet more preferably, the non-aqueous reactive solvent is a cycloalkanone. Most preferably, the non-aqueous reactive solvent is cyclopentanone.

Where the non-aqueous reactive solvent is acetone/methanol the ratio (v/v) of acetone to methanol is in the range 1:1.5 to 1:5. The inclusion of dimethylsulfoxide (DMSO) as a component of the non-aqueous reactive solvent is optional. The exclusion of amines (e.g. ethylamine) as components of the non-aqueous reactive solvent is required.

Preferably, the molar ratio of chlorosulfonated poly(ether ether ketone) to $C_{2-6}$-dioic cross-linking agent is in the range 1 to 3. More preferably, the molar ratio of chlorosulfonated poly(ether ether ketone) to polyhydric alcohol is 2.

Preferably, the molar ratio of chlorosulfonated poly(ether ether ketone) to Friedel-Crafts type catalyst is in the range 10 to 30. More preferably, the molar ratio of chlorosulfonated poly(ether ether ketone) to chloride catalyst is 20.

Preferably, the ratio of the weight (g) of chlorosulfonated poly(ether ether ketone) to the volume (mL) of non-aqueous reactive solvent in the mixture is in the range 0.07 to 0.11. More preferably, the ratio of the weight (g) of chlorosulfonated poly(ether ether ketone) to the volume (mL) of non-aqueous reactive solvent in the mixture is in the range 0.08 to 0.10. Most preferably, the ratio of the weight (g) of chlorosulfonated poly(ether ether ketone) to the volume (mL) of non-aqueous reactive solvent in the mixture is 0.09.

Preferably, the temperature is in the range 60° C. to 110° C. More preferably, the temperature is in the range 80° C. to 90° C. Most preferably, the temperature is 85° C.

In a preferred embodiment of the third aspect the invention provides a method of preparing a film of a cross-linked sulfonated poly(ether ether ketone) comprising the steps of:
1. incubating in the presence of Friedel-Crafts type catalyst a mixture of a chlorosulfonated poly(ether ether ketone) and a $C_{2-6}$-dioic cross-linking agent solvated in a non-aqueous reactive solvent at a temperature of 80 to 90° C. for one and a half to two and a half hours; and then
2. casting the cooled mixture onto a plate and curing at a temperature of 80 to 90° C. for two to three hours to provide the film.

Preferably, the Friedel-Crafts type catalyst is ferric chloride ($FeCl_3$).

Preferably, the $C_{2-6}$-dioic cross-linking agent is selected from the group consisting of: ethanedioic acid (oxalic acid; CAS Registry no. 144-62-7), 2-hydroxypropanedioic acid (CAS Registry no. 80-69-3); 2,3-dihydroxybutanedioic acid and 2-hydroxy-1,2,3-propanetricarboxylic acid (citric acid; CAS Registry no. 77-92-9). More preferably, the $C_{2-6}$-dioic cross-linking agent is selected from the group consisting of: ethanedioic acid (oxalic acid; CAS Registry no. 144-62-7); (2R,3R)-2,3-dihydroxybutanedioic acid (tartaric acid; CAS Registry no. 87-69-4) and 2-hydroxy-1,2,3-propanetricarboxylic acid (citric acid; CAS Registry no. 77-92-9).

Preferably, the non-aqueous reactive solvent is a carbonic solvent. More preferably, the non-aqueous reactive solvent is a ketonic solvent. Yet more preferably, the non-aqueous reactive solvent is a cycloalkanone. Most preferably, the non-aqueous reactive solvent is cyclopentanone.

Preferably, the molar ratio of chlorosulfonated poly(ether ether ketone) to $C_{2-6}$-dioic cross-linking agent is in the range 1 to 3. More preferably, the molar ratio of chlorosulfonated poly(ether ether ketone) to polyhydric alcohol is 2.

Preferably, the molar ratio of chlorosulfonated poly(ether ether ketone) to Friedel-Crafts type catalyst is in the range 10 to 30. More preferably, the molar ratio of chlorosulfonated poly(ether ether ketone) to chloride catalyst is 20.

Preferably, the ratio of the weight (g) of chlorosulfonated poly(ether ether ketone) to the volume (mL) of non-aqueous reactive solvent in the mixture is in the range 0.07 to 0.11. More preferably, the ratio of the weight (g) of chlorosulfonated poly(ether ether ketone) to the volume (mL) of non-aqueous reactive solvent in the mixture is in the range 0.08 to 0.10. Most preferably, the ratio of the weight (g) of chlorosulfonated poly(ether ether ketone) to the volume (mL) of non-aqueous reactive solvent in the mixture is 0.09.

In a fourth aspect the invention provides a cross-linked sulfonated poly(ether ether ketone) prepared by the method of the third aspect of the invention.

In a fifth aspect the invention provides a cross-linked sulfonated poly(ether ether ketone) comprising the structure:

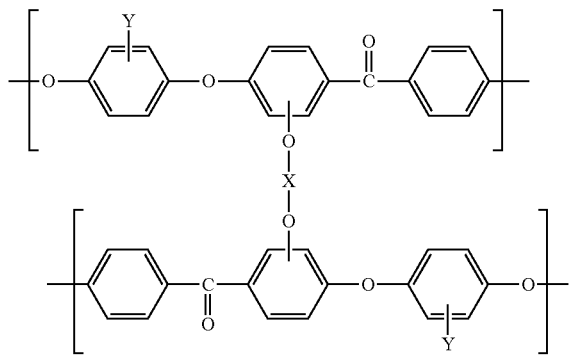

where X is a divalent radical of the structure:

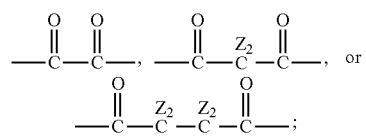

Y may be either H or a monovalent radical selected from the group consisting of: —$SO_3H$ and —$SO_2Cl$; and Z are monovalent radicals selected independently from the group consisting of: H, —OH and —COOH.

Preferably, the invention provides a cross-linked sulfonated poly(ether ether ketone) comprising the structure:

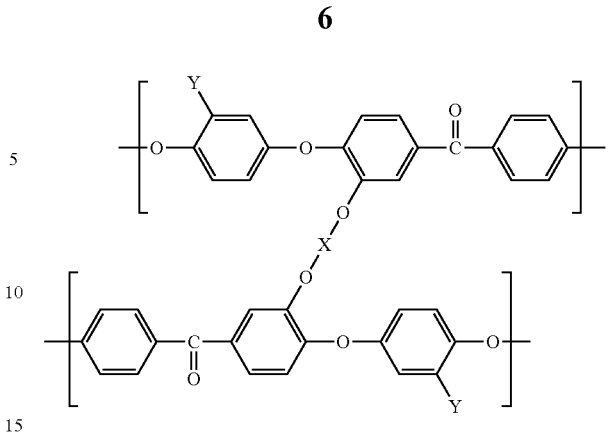

In a first embodiment of the fifth aspect the invention provides a cross-linked sulfonated poly(ether ether ketone) comprising the structure:

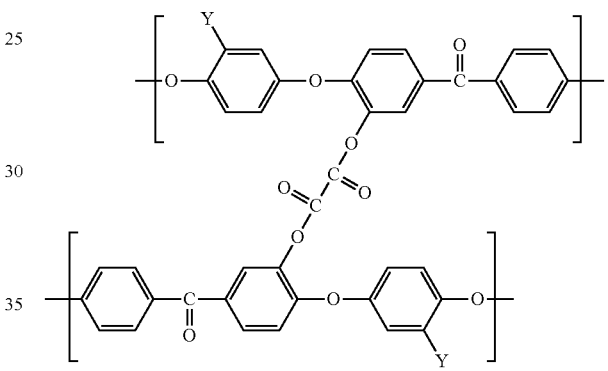

In a second embodiment of the fifth aspect the invention provides a cross-linked sulfonated poly(ether ether ketone) comprising the structure:

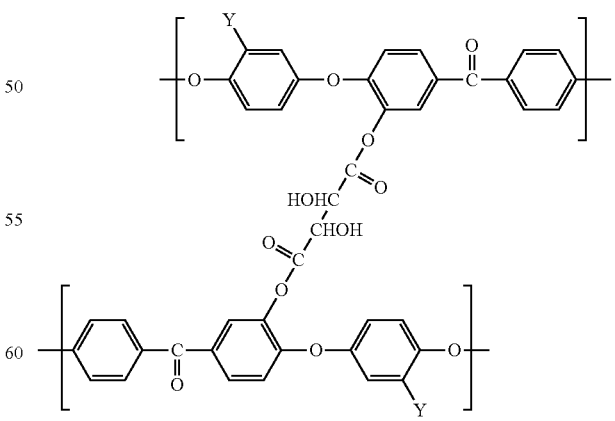

In a third embodiment of the fifth aspect the invention provides a cross-linked sulfonated poly(ether ether ketone) comprising the structure:

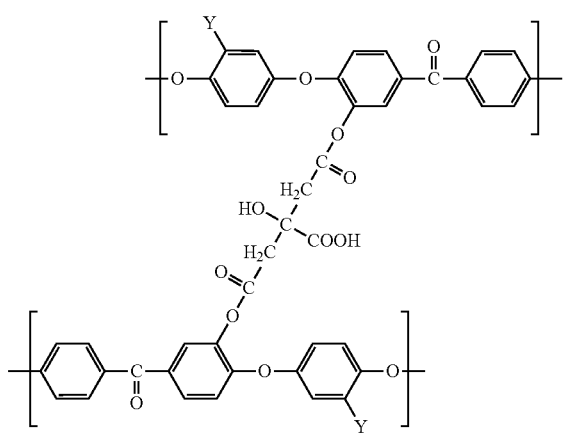

A cross-linked sulfonated poly(ether ether ketone) of the fifth aspect of the invention may be prepared by the method of the third aspect of the invention and each may be prepared as a film.

In a sixth aspect the invention provides a method of preparing a cross-linked sulfonated poly(ether ether ketone) comprising the step of incubating in the presence of a Friedel-Crafts type catalyst a mixture of a chlorosulfonated poly(ether ether ketone) and a $C_{2-9}$-dioyl halide cross-linking agent solvated in a non-aqueous reactive solvent at a temperature substantially below 180° C. for a period of time sufficient to provide the cross-linked sulfonated poly(ether ether ketone).

Preferably, the Friedel-Crafts type catalyst is ferric chloride ($FeCl_3$).

Preferably, the $C_{2-9}$-dioyl halide is a $C_{2-9}$-dioyl chloride such as 1,3,5-benzenetricarbonyl trichloride (trimesoyl trichloride; CAS Registry no. 4422-95-1) or butanedioyl dichloride (succinyl chloride; CAS Registry no. 543-20-4). More preferably, the $C_{2-9}$-dioyl halide is an aliphatic $C_{2-6}$-dioyl chloride. Yet more preferably, the $C_{2-9}$-dioyl halide is an acyclic, aliphatic $C_{2-6}$-dioyl chloride. Most preferably, the $C_{2-9}$-dioyl halide is butanedioyl dichloride.

Preferably, the non-aqueous reactive solvent is a carbonic solvent. More preferably, the non-aqueous reactive solvent is a ketonic solvent. Yet more preferably, the non-aqueous reactive solvent is a cycloalkanone. Most preferably, the non-aqueous reactive solvent is cyclopentanone.

Preferably, the molar ratio of chlorosulfonated poly(ether ether ketone) to $C_{2-9}$-dioyl halide cross-linking agent is in the range 1 to 3. More preferably, the molar ratio of chlorosulfonated poly(ether ether ketone) to $C_{2-9}$-dioyl halide cross-linking agent is 2.

Preferably, the molar ratio of chlorosulfonated poly(ether ether ketone) to Friedel-Crafts type catalyst is in the range 5 to 15. More preferably, the molar ratio of chlorosulfonated poly(ether ether ketone) to Friedel-Crafts type catalyst is 10.

Preferably, the temperature is substantially below 180° C. More preferably, the temperature is in the range 120° C. to 170° C. Most preferably, the temperature is 150° C.

Preferably, the period of time is 15 to 105 minutes. More preferably, the period of time is 30 minutes.

In an embodiment of the sixth aspect the invention provides a method of preparing a film of a cross-linked sulfonated poly(ether ether ketone) comprising the steps of casting a mixture of a chlorosulfonated poly(ether ether ketone), a $C_{2-9}$-dioyl halide cross-linking agent and a Friedel-Crafts type catalyst solvated in a non-aqueous reactive solvent and curing at a temperature substantially below 180° C. for a period of 15 to 105 minutes to provide the film. Preferably, the Friedel-Crafts type catalyst is ferric chloride ($FeCl_3$), the $C_{2-9}$-dioyl halide cross-linking agent is butanedioyl dichloride, the non-aqueous reactive solvent is cyclopentanone and the curing is at 150° C. for 30 minutes.

In a seventh aspect the invention provides a cross-linked sulfonated poly(ether ether ketone) prepared by the method of the first aspect of the invention. A cross-linked sulfonated poly(ether ether ketone) of the second aspect of the invention may be prepared as a film.

In the description and claims of this specification the following acronyms, terms and phrases have the meaning provided: "alicyclic" means cyclic aliphatic; "aliphatic" means alkanes, alkenes or alkynes or their derivatives and is used as a descriptor for compounds that do not have the special stability of aromatics; "alkanes" means a saturated hydrocarbon of the general formula $C_nH_{2n+2}$; "alkenes" means unsaturated hydrocarbons that contain one or more double carbon-carbon bonds; "alkynes" means unsaturated hydrocarbons that contain one or more triple carbon-carbon bonds; "aromatic" means containing a benzene ring or having similar chemical properties; "bursting strength" means the maximum uniformly distributed pressure applied at right angles to its surface, that a single sample location can withstand under test conditions; "$C_{2-6}$-dicarboxylic" means a non-aromatic organic acid comprising two or more carboxylic acid functional groups; "carbonic solvent" means a component of the solvent composition comprises a carbonic (aldonic or ketonic) function; "comprising" means "including", "containing" or "characterized by" and does not exclude any additional element, ingredient or step; "consisting essentially of" means excluding any element, ingredient or step that is a material limitation; "consisting of" means excluding any element, ingredient or step not specified except for impurities and other incidentals; "copolymer" means a polymer formed by the polymerization of two or more monomers; "crosslinking agents" means materials that are incorporated into the crosslinking bridge of a polymer network; "crosslinking" means the formation of a three-dimensional polymer network by covalent bonding between the main chains of the polymer; "csPEEK" means chlorosulfonated PEEK; "dioyl halide" means a dicarboxylic acid halide of the general structure XOC—R—COX where X is a halogen and R may be either aliphatic or aromatic and includes a trioyl halide; "DS" means degree of sulfonation being the number of sulfonated units per 100 monomer units expressed as a percentage; "durable" means capable of maintaining performance during repeated clean-in-place (CIP) protocols; "DXL" means degree of crosslinking being the number of crosslinks per 100 monomer units expressed as a percentage; "flow" means the rate at which the feed stream is introduced; "flux" means the rate of permeate transported per unit of membrane area; "graft polymer" means a polymer in which the linear main chain has attached to it at various points macromolecular side chains of a structure different from the main chain; "homopolymer" means a polymer formed by the polymerization of a single monomer; "hydrophilic" means having a tendency to mix with, dissolve in, or be wetted by water and "hydrophilicity" has a corresponding meaning; "hydrophobic" means having a tendency to repel or fail to mix with water and "hydrophobicity" has a corresponding meaning; "ionomer" means a polymer that comprises both electrically neutral structurally repeating units and a fraction of ionized structurally repeating units (usually no more than 15 mole percent); "ketonic solvent" means a component of the solvent composition comprises a ketonic function; "non-aqueous" means initially excluding water; "passage" means the percentage of dissolved species in the feed stream allowed to pass through the membrane; "PEEK" means poly(oxy-1,4-phenyleneoxy-1.4-phenylenecarbonyl-1,4-phenylene); "permeate" means the purified product water; "polyelectrolyte" means a polymer that comprises structurally repeating units bearing an electrolyte group that will dissociate in aqueous solutions making the polymer charged; "polymer blend" means a homogenous or heterogeneous physical mixture of two or more polymers; "polyol" means an acyclic alcohol containing three or more hydroxyl functional groups including the triol glycerol (glycerine); "post-treated polymer" means a polymer that is modified, either partially or completely, after the basic polymer backbone has been formed; "reactive solvent" means a solvent capable of abstracting chloride or a chlorine radical from a chlorosulfonated polymer, e.g. csPEEK; "recovery" means the percentage of the feed stream that emerges from the system as product water or "permeate"; "rejection" means the percentage of solids concentration removed from the feed stream by the membrane; "solvated" means associated or combined with molecules of a solvent and includes in solution; "sPEEK" means sulfonated PEEK and includes csPEEK; "structural repeating unit" means a smallest structural unit that repeats in the polymer backbone, e.g. oxy-1,4-phenyleneoxy-1.4-phenylenecarbonyl-1,4-phenylene is the structural repeating unit of PEEK; "tensile strength" means the maximum tensile stress sustained by a specimen at the yield point (tensile strength at yield) or at break (tensile strength at break) during a tension test; "trioyl halide" means a tricarboxylic acid halide of the general structure R(COX)$_3$ where X is a halogen and R may be either aliphatic or aromatic and "xsPEEK" means cross-linked sulfonated PEEK (sPEEK) and includes cross-linked chlorosulfonated PEEK (csPEEK).

The phrase "rejection layer" is used synonymously with the phrase "barrier layer" and the phrase "backing layer" is used synonymously with the phrase "support layer". The term "film" is generally used when referring to the rejection layer of the asymmetric composite membrane and the term "sheet" is generally used when referring to the backing layer of the asymmetric composite membrane.

The terms "first", "second", "third", etc. when used with reference to alternative embodiments of the invention are not intended to imply an order of preference. Where values are expressed to one or more decimal places standard rounding applies. For example, 1.7 encompasses the range 1.650 recurring to 1.7499 recurring.

In the absence of further limitation the use of plain bonds in the representations of the structures of compounds encompasses the diastereoisomers, enantiomers and mixtures thereof of the compounds. The use of double bonds in the representations of aromatic ring structures does not exclude delocalisation of the it-electrons and encompasses alternative representations of the same aromatic ring structures. Where a substituted aromatic ring is represented:

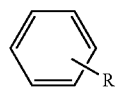

it will be recognised that the ring may be substituted by the monovalent radical R at any available locus (node) of the ring. Although the sulfonic acid function of SPEEK is frequently represented as being located exclusively at the ortho or meta position on the substituted ring it is recognised that unless the sulfonated derivative of the poly(ether ether ketone) substrate has been fully characterised the sulfonic acid function could potentially be located at either location.

The invention will now be described with reference to embodiments or examples and the figures of the accompanying drawings pages.

DETAILED DESCRIPTION

Figure 1:
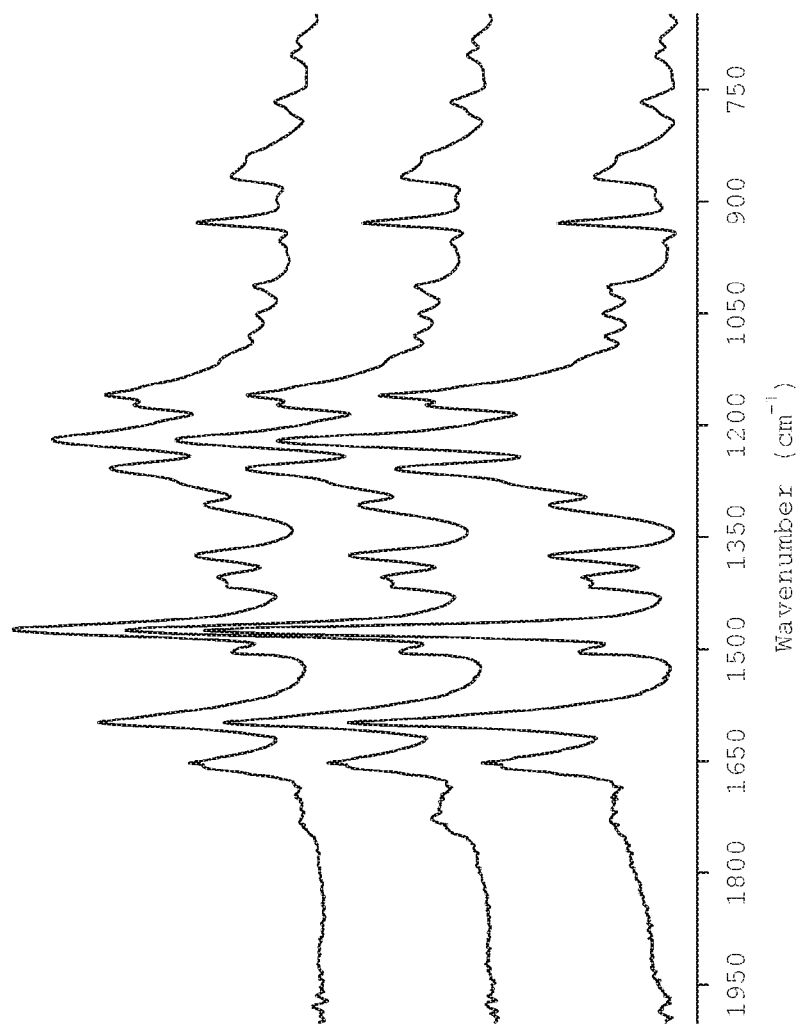
FIG. 1. Comparison of FTIR spectra recorded for samples of cross-linked sulfonated PEEK: 150SClPEEK30 (upper trace), 150SClPEEK15 (middle trace) and control sample (lower trace). The scale of the vertical axis (absorbance; not shown) is the same for each trace.
Figure 2:
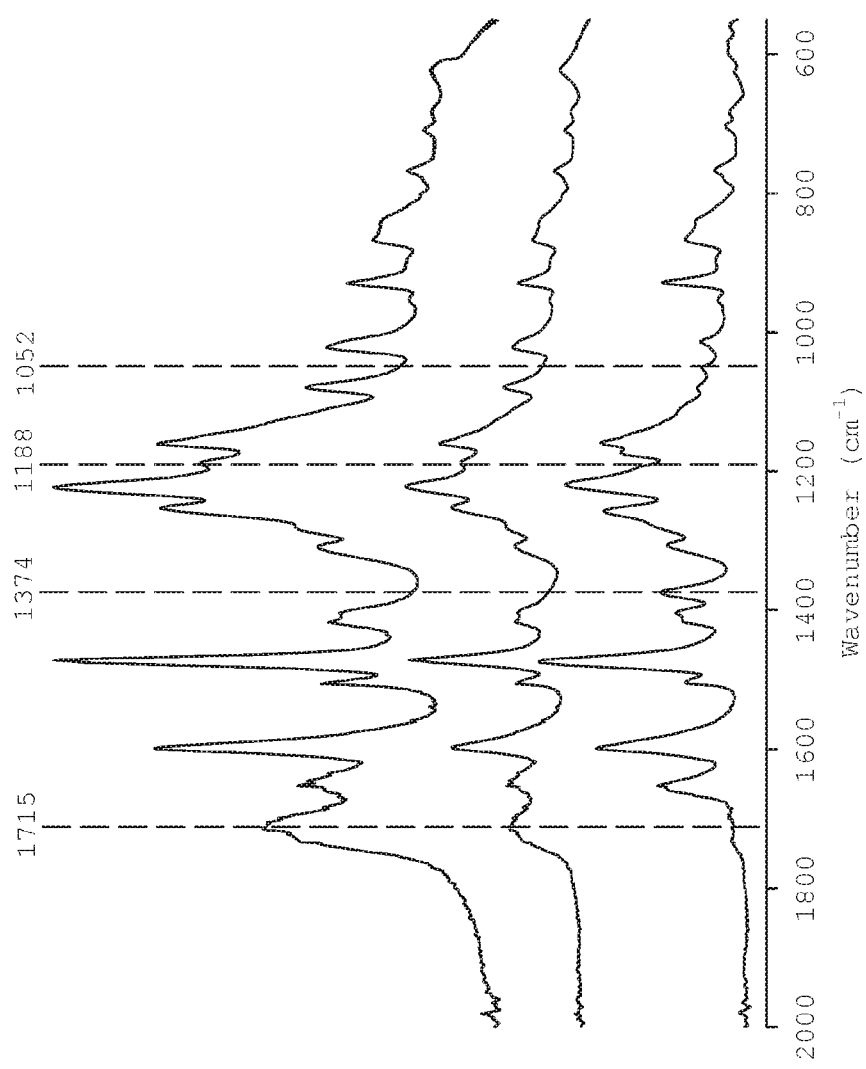
FIG. 2. Comparison of FTIR spectra recorded (2000 to 550 cm$^{-1}$) for selected samples of cross-linked sulfonated PEEK: 150SClPEEK302X (upper trace), 150SCl30 (middle trace) and 150SClPEEK30 (lower trace). The scale of the vertical axis (absorbance; not shown) is the same for each trace.
Figure 3:
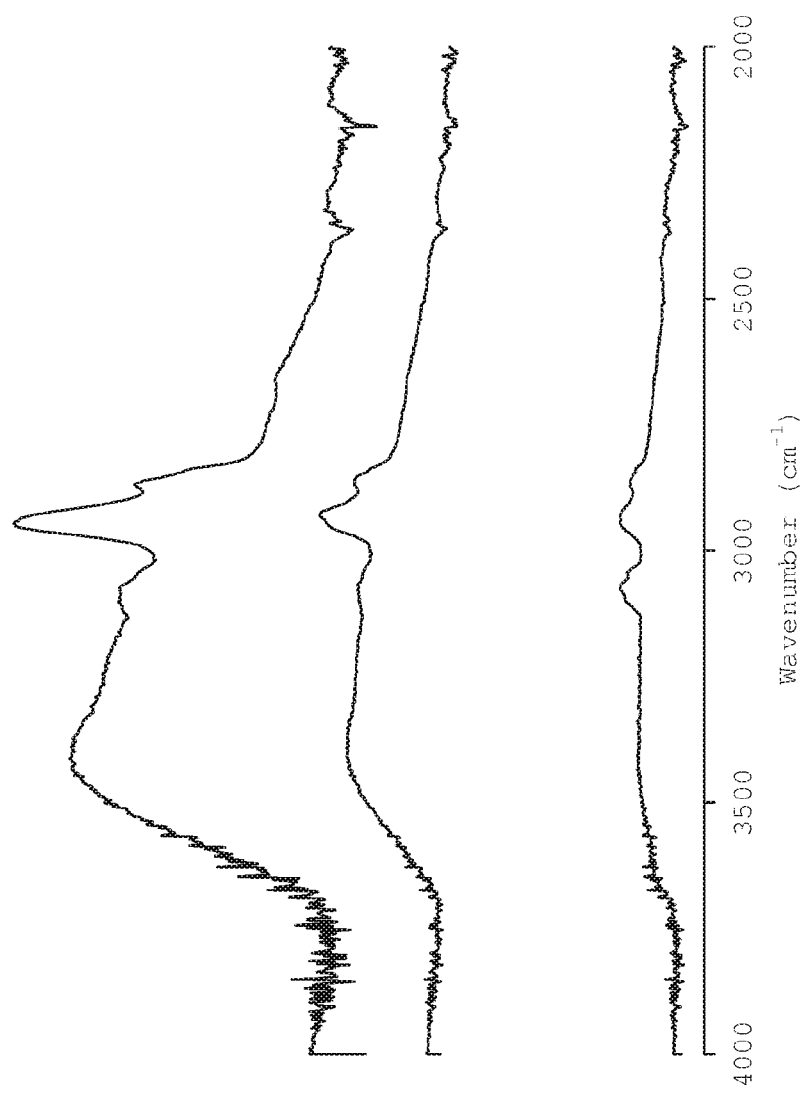
FIG. 3. Comparison of FTIR spectra recorded (4000 to 2000 cm$^{-1}$) for selected samples of cross-linked sulfonated PEEK: 150SClPEEK302X (upper trace), 150SCl30 (middle trace) and 150SClPEEK30 (lower trace). The scale of the vertical axis (absorbance; not shown) is the same for each trace.
Figure 4:
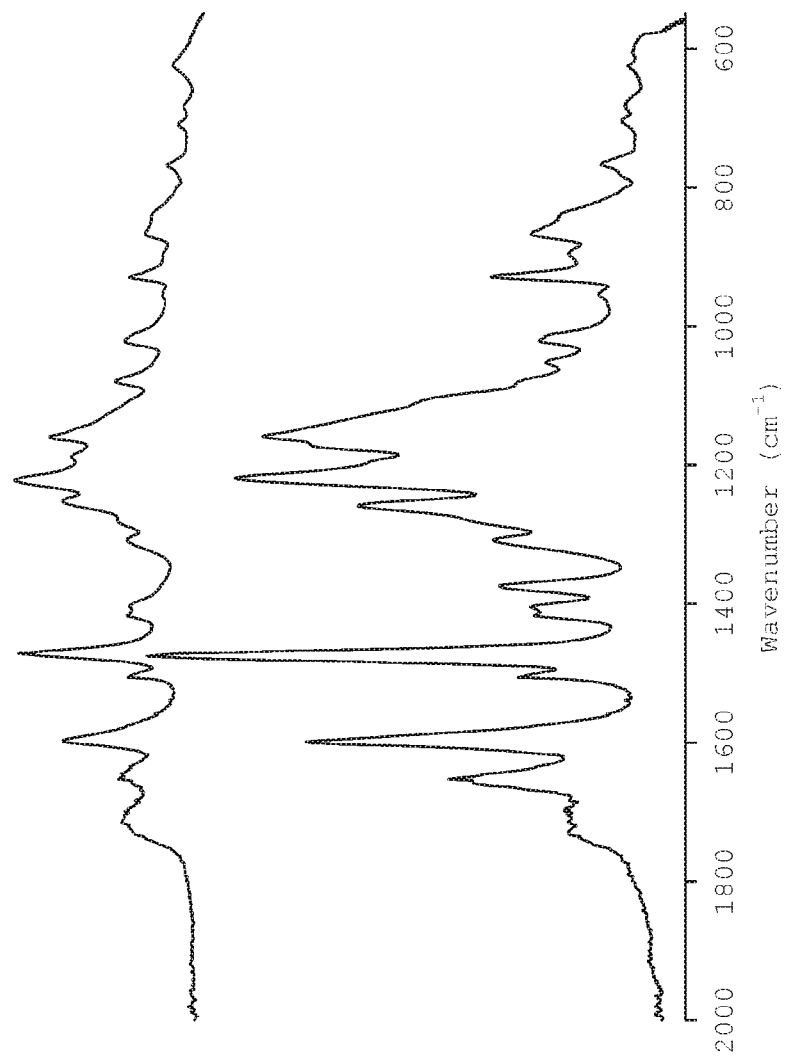
FIG. 4. Comparison of FTIR spectra recorded (2000 to 550 cm$^{-1}$) for samples of cross-linked sulfonated PEEK prepared by casting the same mixture (including the cross-linking agent succinyl chloride) and curing at 150° C. for 30 min or 15 min: 150SCl30 (upper trace) and 150SCl15 (lower trace). The scale of the vertical axis (absorbance; not shown) is the same for each trace.
Figure 5:
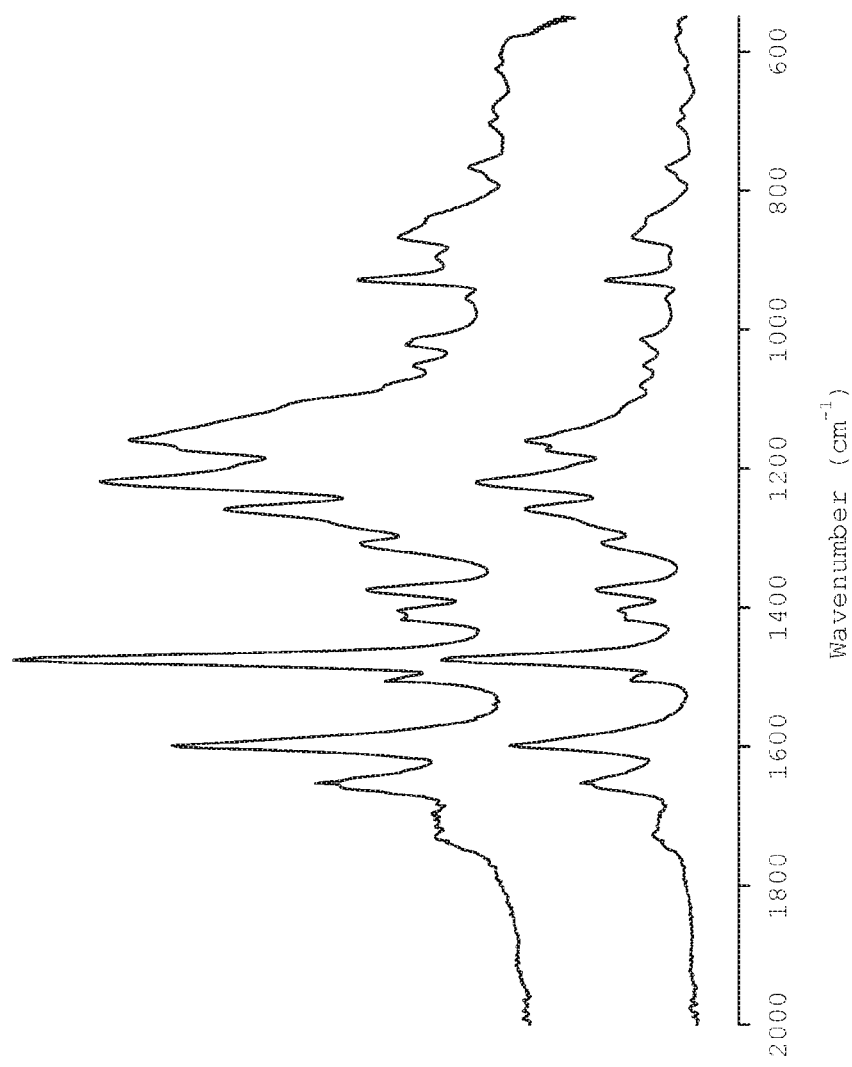
FIG. 5. Comparison of FTIR spectra recorded (2000 to 550 cm$^{-1}$) for samples of cross-linked sulfonated PEEK prepared by casting mixtures with and without the inclusion of the crosslinking agent succinyl chloride and curing at 150° C. for 15 min: 150SCl30 (upper trace) and 50SCl15 (lower trace). The scale of the vertical axis (absorbance; not shown) is the same for each trace.

A chlorosulfonated poly(ether ether ketone) is used as the substrate for cross-linking, specifically csPEEK. It is desirable to retain the degree of hydrophilicity imparted to the PEEK substrate by chlorosulfonation when crosslinking for the purpose of preparing a polymer for use in the fabrication of membranes for use in processes driven by hydrostatic or osmotic pressure. When crosslinking via the introduced chlorosulfonyl groups the degree of hydrophilicity may be reduced. Crosslinking of the csPEEK substrate via a Friedel-Crafts type reaction promotes maintenance of the desired degree of hydrophilicity. Furthermore, curing at temperatures substantially below those known to promote thermally induced crosslinking between chlorosulfony/sulfonyl groups favours the DXL being attributable to participation of the cross-linking agent in the crosslinking reaction. Curing at lower temperatures also reduces the likelihood of thermal degradation of the substrate polymer.

The microstructure of the polymer network formed by cross-linking will also be influenced by the structure of the cross-linking agent selected for use. The combination of a film of cross-linked sulfonated poly(ether ether ketone) rejection layer adhered to a sheet of sulfonated microporous polyethylene backing layer provide an asymmetric composite membrane with the advantage of resistance to chemical decomposition and hence durability in commercial processing operations. In addition, the asymmetric composite membrane is tolerant of desiccation facilitating storage and transport.

EXAMPLE

Preparation of Sulfonated Microporous Poly(Ethylene) ("Support Layer")

A sheet of sulfonated microporous poly(ethylene) was prepared substantially as described in the publication of Briggs (2015). An amount of 250 g of phosphorous pentoxide was added to a volume of 469 mL of sulfuric acid to provide a mixture of 1:5 (mol/mol) phosphorous pentoxide-sulfuric acid and heated to 90° C. to dissolve the phosphorous pentoxide ("sulfonating agent").

Example 1

Sheets of microporous poly(ethylene) were cut in to 15×20 cm pieces and wetted with a mixture of DMSO-trichloromethane (9:1 (v/v)). Excess of the mixture was removed from the pieces before they were frozen by covering them in liquid nitrogen. Immediately after freezing the pieces were added to the sulfonating agent at room temperature and incubated at 80° C. for 90 minutes. The incubated pieces were removed from the sulfonating agent and allowed to sit for 3 hours in order to dilute the acid before rinsing twice with methanol to remove all residual sulfonating agent.

Example 2

Sheets of microporous poly(ethylene) were cut in to 14×28 cm pieces and whetted with a mixture of 20% chloroform and 8% dimethyl sulfoxide (DMSO) before being placed between glass fibre sheets and keeping on dry ice overnight. The sheets were then immersed in the sulfonating agent before being covered and cured in an oven at 85° C. for 90 minutes. Following curing the glass fibre sheets were removed and the sulfonated microporous poly (ethylene) sheet humidified overnight. The sheet was then rinsed with methanol and stored dry before use as a backing layer.

Preparation of Cross-Linked Sulfonated PEEK ("Rejection Layer")

Example 3

Solutions of dry chlorosulfonated poly(ether ether ketone), the cross-linking agent ethanedioic acid (oxalic acid), and the chloride catalyst ferric chloride ($FeCl_3$), were prepared in the non-aqueous reactive solvent cyclopentanone under ambient conditions (room temperature and pressure): 6.6 g of dry chlorosulfonated poly(ether ether ketone) was dissolved in 50 mL of cyclopentanone (solution 1); 0.769 g of ethanedioic acid (oxalic acid) was dissolved in 25 mL of cyclopentanone (solution 2); and 0.138 g of ferric chloride ($FeCl_3$) was dissolved in 25 mL of cyclopentanone (solution 3). A 3 mL volume of solution 2 was added to a 6 mL volume of solution 1 and the two solutions mixed thoroughly. A 3 mL volume of solution 3 was then added and the combined solutions mixed to provide a cross-linking solution. The molar ratio of chlorosulfonated poly(ether ether ketone) to ethanedioic acid (oxalic acid) was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate to provide a film with a thickness of approximately 0.2 mm. The film was cast under ambient conditions and left for two to five minutes before being cured at 85° C. for 2.5 hours. During curing the upper surface of the film was protected with a second glass plate located approximately 1 cm above the surface.

Example 4

Solutions of dry chlorosulfonated poly(ether ether ketone), the cross-linking agent tartaric acid, and the chloride catalyst ferric chloride ($FeCl_3$), were prepared in the non-aqueous reactive solvent cyclopentanone under ambient conditions (room temperature and pressure): 6.6 g of dry chlorosulfonated poly(ether ether ketone) was dissolved in 50 mL of cyclopentanone (solution 1); and 1.281 g of tartaric acid and 0.138 g of ferric chloride ($FeCl_3$) were dissolved in 25 mL of cyclopentanone (solution 2). A 3 mL volume of cyclopentanone was added to a 6 mL volume of solution 1 and mixed thoroughly. A 3 mL volume of solution 2 was then added and the combined solutions mixed to provide a cross-linking solution. The molar ratio of chlorosulfonated poly(ether ether ketone) to tartaric acid was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate to provide a film with a thickness of approximately 0.2 mm. The film was cast under ambient conditions and left for two to five minutes before being cured at 85° C. for 2.5 hours. During curing the upper surface of the film was protected with a second glass plate located approximately 1 cm above the surface.

Example 5

Solutions of dry chlorosulfonated poly(ether ether ketone), the cross-linking agent citric acid, and the chloride catalyst ferric chloride ($FeCl_3$), were prepared in the non-aqueous reactive solvent cyclopentanone under ambient conditions (room temperature and pressure): 6.6 g of dry chlorosulfonated poly(ether ether ketone) was dissolved in 50 mL of cyclopentanone (solution 1); and 1.640 g of citric acid and 0.138 g of ferric chloride ($FeCl_3$) were dissolved in 25 mL of cyclopentanone (solution 2). A 3 mL volume of cyclopentanone was added to a 6 mL volume of solution 1 and mixed thoroughly. A 3 mL volume of solution 2 was then added and the combined solutions mixed to provide a cross-linking solution. The molar ratio of chlorosulfonated poly(ether ether ketone) to citric acid was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate to provide a film with a thickness of approximately 0.2 mm. The film was cast under ambient conditions and left for two to five minutes before being cured at 85° C. for 2.5 hours. During curing the upper surface of the film was protected with a second glass plate located approximately 1 cm above the surface.

Example 6

Solutions of dried chlorosulfonated poly(ether ether ketone), the cross-linking agents ethanedioic acid (oxalic acid) and tartaric acid, and the chloride catalyst ferric chloride ($FeCl_3$), were prepared in the non-aqueous reactive solvent cyclopentanone under ambient conditions (room temperature and pressure): 6.6 g of chlorosulfonated poly(ether ether ketone) was dissolved in 50 mL of cyclopentanone (solution 1); 0.769 g of ethanedioic acid (oxalic acid) was dissolved in 25 mL of cyclopentanone (solution 2); 1.281 g of tartaric acid and 0.138 g of ferric chloride ($FeCl_3$) was dissolved in 25 mL of cyclopentanone (solution 3); and 0.138 g of ferric chloride ($FeCl_3$) was dissolved in 25 mL of cyclopentanone (solution 4). A 1.5 mL volume of cyclopentanone and a 1.5 mL volume of solution 2 was added to a 6 mL volume of solution 1 and mixed thoroughly. A 1.5 mL volume of solution 3 and a 1.5 mL volume of solution 4 was then added and the combined solutions mixed to provide a cross-linking solution. The molar ratio of chlorosulfonated poly(ether ether ketone) to tartaric acid was approximately 1:0.5. The molar ratio of chlorosulfonated poly(ether ether ketone) to ferric chloride ($FeCl_3$) was approximately 1:0.05. The cross-linking solution was incubated at a temperature of 85° C. for two hours and then allowed to cool for 30 minutes under ambient conditions. The cooled cross-linking solution was then cast onto a glass plate to provide a film with a thickness of approximately 0.2 mm. The film was cast under ambient conditions and left for two to five minutes before being cured at 85° C. for 2.5 hours. During curing the upper surface of the film was protected with a second glass plate located approximately 1 cm above the surface.

Example 7

An amount of 50 g of poly(ether ether ketone) (Victrex) having a density of 1.3 g $cm^{-3}$ and a melt viscosity of 400° C. of 90 Pa·s was added to a volume of 250 mL of chloroform (Fisher Chemicals) followed by the addition of a volume of 250 mL of chlorosulfonic acid (Nacalai Tesque Inc.). The mixture was stirred for two hours at 50° C. and then washed twice with two separate volumes of 200 mL of chloroform and thrice with three separate volumes of 400 mL of chloroform. Washing was indicated to be complete when the volume of chloroform used in the washing remained colourless.

The orange coloured, viscous residue remaining following the chloroform washings was washed repeatedly with volumes of deionized water until the pH of the wash water had increased to 5. The resulting whitish coloured product was then broken into small flakes and dried in a vacuum oven at 65° C. for five days.

An amount of 1.9932 g of flakes of the dried, whitish coloured product was added to a volume of 15 mL cyclopentanone (AK Scientific) to provide a 13.2% (w/v) solution of the product. An amount of 0.235 g zinc chloride (Sigma-Aldrich) was added to a volume of 5 mL cyclopentanone (A K Scientific) to provide a 0.55% (w/v) solution of the catalyst.

To a volume of 15 mL of the solution of product in a vial either a volume of 0.3 mL of succinyl chloride (Sigma-Aldrich) or an amount of 0.4 g of 1,3,5-benzenetricarboxylic chloride (Sigma-Aldrich) was added. Following one of these additions a volume of 1.5 mL of the solution of the catalyst was added to provide a mixture of product, cross-linker and catalyst in a molar ratio of 1:0.5:0.1.

Following shaking of the vial the mixture was cast on a glass plate and cured at a predetermined temperature for a predetermined period of time. The temperatures and times used to provide samples of membrane consisting of putatively cross-linked chlorosulfonated poly(ether ether ketone) are presented in Table 1 and Table 2.

For comparative purposes, samples of membrane were also prepared without the addition of cross-linker and catalyst to the cast mixture. The curing conditions used in the preparation of these latter samples are presented in Table 3.

TABLE 1

Curing temperatures and times used for the preparation of putatively cross-linked chlorosulfonated poly(ether ether ketone) membranes where the crosslinking agent was succinyl chloride.

| Sample designation | Curing temp (±5° C.) | Curing time (min) | Molar ratio (product to crosslinking agent) | Molar ratio (product to catalyst) |
|---|---|---|---|---|
| 120SCl15 | 120 | 15 | 1:0.5 | 1:0.1 |
| 120SCl30 | 120 | 30 | 1:0.5 | 1:0.1 |
| 120SCl45 | 120 | 45 | 1:0.5 | 1:0.1 |
| 120SCl60 | 120 | 60 | 1:0.5 | 1:0.1 |
| 120SCl75 | 120 | 75 | 1:0.5 | 1:0.1 |
| 120SCl90 | 120 | 90 | 1:0.5 | 1:0.1 |
| 150SCl15 | 150 | 15 | 1:0.5 | 1:0.1 |
| 150SCl30 | 150 | 30 | 1:0.5 | 1:0.1 |
| 150SCl45 | 150 | 45 | 1:0.5 | 1:0.1 |
| 150SCl60 | 150 | 60 | 1:0.5 | 1:0.1 |
| 150SCl75 | 150 | 75 | 1:0.5 | 1:0.1 |
| 150SCl90 | 150 | 90 | 1:0.5 | 1:0.1 |
| 150SCl105 | 150 | 105 | 1:0.5 | 1:0.1 |
| 160SCl15 | 160 | 15 | 1:0.5 | 1:0.1 |
| 170SCl15 | 170 | 15 | 1:0.5 | 1:0.1 |
| 150SCl302x | 150 | 30 | 1:1 | 1:0.1 |

TABLE 2

Curing temperatures and times used for the preparation of putatively cross-linked chlorosulfonated poly(ether ether ketone) membranes where the crosslinking agent was 1,3,5-benzenetricarboxylic chloride.

| Sample designation | Curing temp (±5° C.) | Curing time (min) | Molar ratio (product to crosslinking agent) | Molar ratio (product to catalyst) |
|---|---|---|---|---|
| 120TMC15 | 120 | 15 | 1:0.33 | 1:0.1 |
| 120TMC30 | 120 | 30 | 1:0.33 | 1:0.1 |
| 120TMC45 | 120 | 45 | 1:0.33 | 1:0.1 |
| 120TMC60 | 120 | 60 | 1:0.33 | 1:0.1 |
| 120TMC75 | 120 | 75 | 1:0.33 | 1:0.1 |
| 120TMC90 | 120 | 90 | 1:0.33 | 1:0.1 |
| 150TMC15 | 150 | 15 | 1:0.33 | 1:0.1 |
| 150TMC30 | 150 | 30 | 1:0.33 | 1:0.1 |
| 150TMC45 | 150 | 45 | 1:0.33 | 1:0.1 |
| 150TMC60 | 150 | 60 | 1:0.33 | 1:0.1 |
| 150TMC75 | 150 | 75 | 1:0.33 | 1:0.1 |
| 160TMC15 | 160 | 15 | 1:0.33 | 1:0.1 |
| 170TMC15 | 170 | 15 | 1:0.33 | 1:0.1 |

TABLE 3

Curing temperatures and times used for the preparation of chlorosulfonated poly(ether ether ketone) membranes without the addition of catalyst or crosslinking agent.

| Sample designation | Curing temp (±5° C.) | Curing time (min) | Molar ratio (product to crosslinking agent) | Molar ratio (product to catalyst) |
|---|---|---|---|---|
| 120SClPEEK15 | 120 | 15 | — | — |
| 120SClPEEK30 | 120 | 30 | — | — |
| 120SClPEEK45 | 120 | 45 | — | — |
| 120SClPEEK60 | 120 | 60 | — | — |
| 120SClPEEK75 | 120 | 75 | — | — |
| 120SClPEEK90 | 120 | 90 | — | — |
| 150SClPEEK15 | 150 | 15 | — | — |
| 150SClPEEK30 | 150 | 30 | — | — |
| 150SClPEEK45 | 150 | 45 | — | — |
| 150SClPEEK60 | 150 | 60 | — | — |
| 150SClPEEK75 | 150 | 75 | — | — |
| 150SClPEEK90 | 150 | 90 | — | — |
| 150SClPEEK105 | 150 | 105 | — | — |
| 150SClPEEK120 | 150 | 120 | — | — |
| 160SClPEEK15 | 160 | 15 | — | — |
| 170SClPEEK15 | 170 | 15 | — | — |

Characterisation of Membranes

Solubilities of samples of membrane were determined at room temperature by placing a small piece (circa 25 mm$^2$) of sample in a volume of 3 mL of a solvent. A lack of solubility in various solvents was indicative of the sample of membrane consisting of cross-linked polymer. The appearances and solubilities of the samples in the solvent cyclopentanone are presented in Table 4. The solubility of selected samples of membrane (150SClPEEK30, 150SCl30 and 150SCl302x) in the solvents acetone, dimethylsulfoxide and methanol and acid (nitric acid) and alkali (sodium hydroxide)) are presented in Table 5.

Fourier transform infrared spectra (FTIR) were recorded using a Thermo Electron Nicolet 8700 spectrometer equipped with a single bounce ATR and diamond crystal. An average of 32 scans with a 4 cm$^{-1}$ resolution were recorded for each sample. For comparative purposes the FTIR spectrum of a sample of membrane prepared by the casting of a mixture without the addition of crosslinking agent or catalyst (control sample) was also recorded. All samples were washed with deionised water before recording scans. Comparisons of the FTIR spectra recorded for the selected samples of membrane and the control sample are presented in FIGS. 1 to 5.

The observed solubilities and FTIR spectra of the selected samples of membrane are consistent with crosslinking of the csPEEK substrate having occurred.

TABLE 4

Appearance and solubility in cyclopentanone (after 24 hours) of samples of membrane.

| Sample | Appearance | Solubility |
|---|---|---|
| 120SClPEEK15 | Brown film | Soluble |
| 120SClPEEK30 | Dark brown film | Soluble |
| 120SClPEEK45 | Dark brown film | Soluble |
| 120SClPEEK60 | Dark brown film | Soluble |
| 120SClPEEK75 | Dark brown film | Soluble |
| 120SClPEEK90 | Black film | Soluble |
| 150SClPEEK15 | Dark brown film | Soluble |
| 150SClPEEK30 | Black film | Soluble |
| 150SClPEEK45 | Black film | Soluble |
| 150SClPEEK60 | Black film, brittle | Soluble |
| 150SClPEEK75 | Black film, brittle | Soluble |
| 150SClPEEK90 | Black film brittle | Partially soluble |
| 150SClPEEK105 | Black film, brittle | Partially soluble |
| 150SClPEEK120 | Black film brittle | Partially soluble |
| 160SClPEEK15 | Black film | Soluble |
| 170SClPEEK15 | Black film | Soluble |
| 120SCl15 | Brown film | Soluble |
| 120SCl30 | Dark brown film | Soluble |
| 120SCl45 | Dark brown film | Soluble |
| 120SCl60 | Dark brown fim | Soluble |
| 120SCl75 | Dark brown film | Soluble |
| 120SCl90 | Dark brown film | Soluble |
| 150SCl15 | Black film | Partially soluble |
| 150SCl30 | Black film | Insoluble |
| 150SCl45 | Black film, brittle | Insoluble |
| 150SCl60 | Black film, brittle | Insoluble |
| 150SCl75 | Black film, brittle | Insoluble |
| 150SCl90 | Black film, brittle | Insoluble |
| 150SCl105 | Black film, brittle | Insoluble |
| 160SCl15 | Black film | Soluble |
| 170SCl15 | Black film | Partially soluble |
| 150SCl302x | Black film | Insoluble |
| 120TMC15 | Brown film | Soluble |
| 120TMC30 | Dark brown film | Soluble |
| 120TMC45 | Dark brown film | Soluble |
| 120TMC60 | Dark brown film | Soluble |
| 120TMC75 | Dark brown film | Partially soluble |
| 120TMC90 | Dark brown film | Partially soluble |
| 150TMC15 | Black film | Partially soluble |
| 150TMC30 | Black film, brittle | Partially soluble |
| 150TMC45 | Black film, brittle | Insoluble |
| 150TMC60 | Black film, brittle | Insoluble |
| 150TMC75 | Black film, brittle | Insoluble |
| 160TMC15 | Black film | Soluble |
| 170TMC15 | Black film | Partially soluble |

TABLE 5

Solubilities of selected samples (shaded, Table 4) in different solvents.

| Solvent | 150SClPEEK30 | 150SCl30 | 150SCl302x |
|---|---|---|---|
| Dimethylsulfoxide | Dissolved | Undissolved, swollen | Undissolved, swollen |
| Cyclopentanone | Dissolved | Undissolved, swollen | Undissolved, swollen |
| Acetone | Undissolved, slightly swollen | Undissolved, slightly swollen | Undissolved, slightly swollen |
| Methanol | Undissolved, swollen | Undissolved, slightly swollen | Undissolved, slightly swollen |
| Sodium hydroxide solution (pH 13) | Undissolved | Undissolved | Undissolved |
| Nitric acid (pH 2) | Undissolved | Undissolved | Undissolved |
| Cyclonentanone (after 24 hours in sodium hydroxide solution (pH 13)) | Undissolved, slightly swollen | Undissolved | Undissolved |
| Cyclopentanone (after 24 hours in nitric acid (pH 2)) | Dissolved partially, swollen | Undissolved, swollen | Undissolved, swollen |

Example 8

An amount of 13.97 g of poly(ether ether ketone) (Victrex) having a density of 1.3 g cm$^{-3}$ and a melt viscosity at 400° C. of 90 Pa·s was added to a volume of 66.5 mL of chloroform (Fisher Chemicals) mixed with 3.5 mL thionyl chloride. An amount of 70 g cholorsulfonic acid (Nacalai Tesque Inc.) was then added and the mixture stirred for two hours at 50° C. The mixture was then washed twice with two separate volumes of 200 mL of chloroform and thrice with three separate volumes of 400 mL of chloroform. Washing was indicated to be complete when the volume of chloroform used in the washing remained colourless. The orange coloured, viscous residue remaining following the chloroform washings was washed repeatedly with volumes of deionized water until the pH of the wash water had increased to 5. The resulting whitish coloured product was then broken into small flakes and dried in a vacuum oven at 65° C. for four days. Following drying the product was added to a volume of 100 mL tetrachloroethylene and a volume of 20 mL thionyl chloride and stirred for five hours. The product was then dried in a vacuum oven at 65° C. overnight.

Preparation of Asymmetric Composite Membrane

Example 9

The cooled crosslinking solution was cast onto a borosilicate glass plate to provide a wet film with a thickness of 50 to 600 μM prior to curing. A sheet of the sulfonated microporous poly(ethylene) was adhered by applying directly to the wet film ensuring full contact between the abutting surfaces of the film and sheet. The asymmetric composite was then transferred to an oven and cured for a period of ten to ninety minutes at a temperature of greater than 85° C., but not exceeding the melting point of the sheet. Following cooling the asymmetric composite membrane was removed from the glass plate in warm water.

Example 10

The cooled crosslinking solution was cast onto a borosilicate glass plate to provide a wet film with a thickness of 50 to 600 μM prior to curing. The cast crosslinking solution was allowed to stand under ambient conditions (room temperature and non-condensing humidity) for a period of at least 30 minutes. A sheet of the sulfonated microporous poly(ethylene) was then adhered by applying directly to the film formed by coagulation ensuring full contact between the abutting film and sheet surfaces. The asymmetric composite was then transferred to an oven and cured for a period of ten to ninety minutes at a temperature of greater than 85° C., but not exceeding the melting point of the sheet. Following cooling the asymmetric composite membrane is removed from the glass plate in warm water.

Example 11

A solution of chlorosulfonated poly(ether ether ketone) product obtained according to Example 8 was prepared at a concentration of 0.132 g/mL in cyclopentanone. To a volume of 15 mL of this solution an amount of 0.3 mL succinyl chloride (as cross-linking agent) and 1.5 mL zinc chloride (as catalyst) was added to provide a mixture of product, cross-linking agent and catalyst in a molar ratio of 1:0.5:0.1. The mixture was cast on a glass plate and the solvent evaporated at 85° C. before curing of the film at 120° C. for one hour. The cured film was then whetted with 50% tetrachloroethylene in chloroform before adhering a sheet of dry sulfonated microporous poly(ethylene) as the backing layer. To adhere the sheet of sulfonated microporous poly(ethylene) prepared according to Example 2, the sheet was flattened using 25% tetrachloroethylene in chloroform and 20% tetrachloroethylene in a mixture of 10% cyclopentanone and 90% chloroform followed by cyclopentanone. The asymmetric composite was then dried at 85° C. for 15 minutes and the membrane evaluated.

Performance of Asymmetric Composite Membrane

Figure 6:
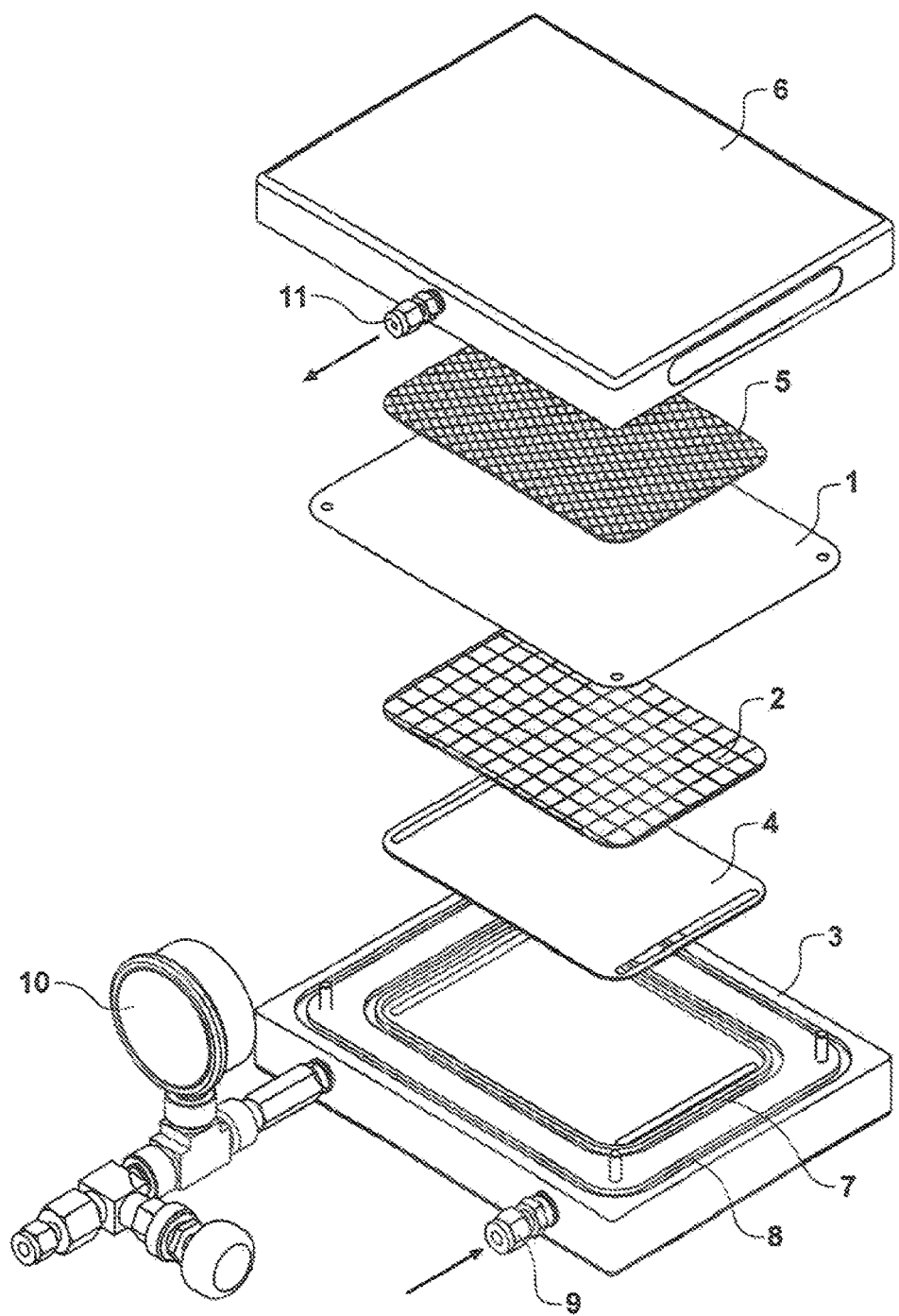
FIG. 6. Exploded view of the filter assembly (Sterlitech Corp.).
Figure 7:
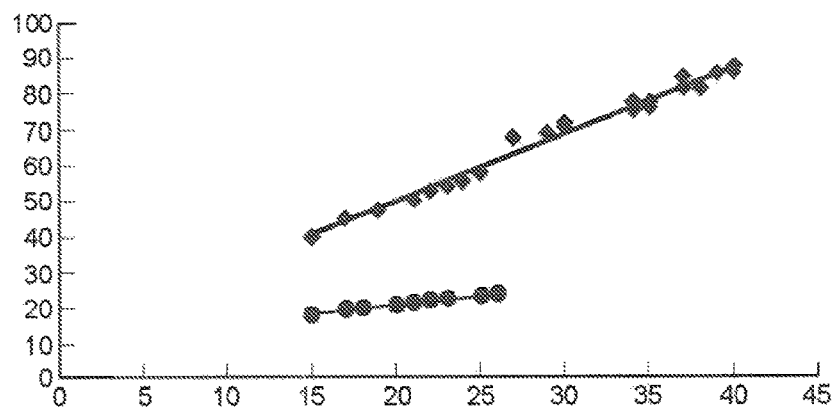
FIG. 7. Graph showing dependency of flux rate (L/m2h) (Y axis) on temperature (degrees C.) of the feed stream where the feed stream was milk (solid circles) or water (solid diamonds).
Figure 8:
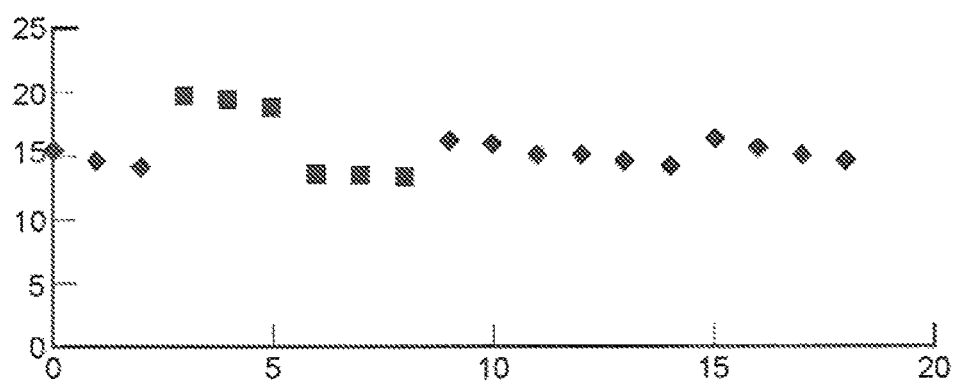
FIG. 8. Flux rates (L/m$^2$h) (Y axis) where the feed stream was milk at a pressure of 20 bar (solid diamonds) or 28 bar (solid squares) with in situ cleaning (vertical lines).

The performance of the asymmetric composite membranes prepared according to Examples 10 and 11 were evaluated using a reverse osmosis (RO) filter assembly of the type illustrated in FIG. 6.

Example 10

Flux Testing

A section of the asymmetric composite membrane (1) was pre-wetted by dipping in distilled water and then placed on a coarse support mesh (2) located in the lower half (3) of the filter assembly housing, with a shim (4) optionally interposed. The section was placed with the rejection layer of the asymmetric composite membrane facing downwards. A fine mesh (5) located in the upper half of the filter assembly (6) housing was placed over the upper surface of the section of the asymmetric composite membrane (1). The filter assembly was sealed by sealing rings (7,8) and held in a hydraulic press pressurised to 60 Bar. The inlet port (9) of the lower half of the filter assembly housing (3) was in fluid connection with a feed reservoir (not shown) from which a feed stream was pumped at a rate to maintain the feed stream pressure measured on the pressure gauge (10). A pressure of 5 Bar was maintained for feed streams comprising water and salts. A pressure of 10 Bar was maintained for feed streams of milk. Feed streams were pre-chilled to 8° C. to mimic commercial processing conditions. Permeate was collected from the outlet port (11) of the upper half of the filter assembly housing (6) in a graduated cylinder (not shown). Collection was started at least 5 minutes after the commencement of permeate being discharged from the outlet port (11) in order to exclude water from the pre-wetting of the membrane or permeate from previously used feed streams.

In Situ Cleaning of Membrane

To mimic commercial processing operations the asymmetric composite membrane was subjected to repeated in situ washing protocols. The intermediate and subsequent flux rates were determined to assess the likely durability of the membrane in commercial processing operations. The in situ washing protocol was based on that employed in a commercial processing operation, but modified in duration to compensate for the greater exposure of the membrane to the cleaning agents (caustic and acid) in the filter assembly. Prior to the washing steps the membrane was rinsed by circulating water at an initial temperature of 65° C. through the filter assembly for a period of three minutes before draining the system.

The membrane was subjected to a first wash by circulating a circa 2% (w/v) sodium hydroxide solution ("caustic wash") through the filter assembly for a period of five minutes before draining and flushing the system by circulating water at an initial temperature of 65° C. through the filter assembly system for a period of five minutes. The membrane was subjected to a second wash by circulating a circa 2% (w/w) nitric acid solution ("acid wash") through the filter assembly system for a period of ten minutes before draining and flushing the system of circulating water at an initial temperature of 65° C. for a period of ten minutes. The membrane was subjected to a third wash (a "caustic wash") before flushing the system by circulating water at an initial temperature of 65° C. for a period of five minutes before circulating chilled water for a period of five minutes to cool the system. All rinsing and washing steps were performed with no pressure recorded on the pressure gauge (8).

Samples of the asymmetric composite membrane were tested for tensile strength and burst strength following flux testing and in situ washing to assess the likely durability of the membrane in commercial processing operations. All testing methods were performed in accordance with ASTM standards (Anon (2009), Anon (2010) and Anon (2012)).

Tensile Strength Testing

Samples for testing were excised from a sheet of the asymmetric composite membrane used in flux testing using a die and hydraulic press. The die was positioned on the upper surface of the sheet of the asymmetric composite membrane supported on a wooden board. Sufficient pressure was applied to the die using the hydraulic press to cut through the sheet. The sample was carefully removed from the die and subjected to testing according to the following protocol.

Samples were preconditioned at 23° C. plus or minus 2° C. and 50% plus or minus 10% relative humidity prior to testing. The thicknesses and widths of samples were measured at three points along the gage length of each sample. The calibrated load weighting system was zeroed and the machine crosshead adjusted to provide the required grip separation. Samples were placed in alignment in the grips of the universal testing machine ensuring sufficient tension on both edges of the sample. Where necessary, blotting or filter paper was used on the surface of the grips to prevent slippage. The extension indicator and recording system of the universal testing machine were reset before starting the machine and testing the samples to failure. Parts of samples tested to failure were removed from the universal testing machine and labelled. Data from testing of samples that failed outside the gage length, i.e. where contacting the grips of the universal testing machine or by tearing with an angle of separation greater than 30 degrees from the perpendicular, were excluded from analyses.

Bursting Strength Testing

The bursting strength of a sheet of the asymmetric composite membrane used in flux testing was measured (according to Mullen) using a tester (Burst-o-Matic™, Lorentzen and Wittre). Measurements were taken at multiple locations on the sheet. Data are presented in Table 6.

TABLE 6

Comparison of burst pressures for the used asymmetric composite membrane and an unused commercially available porous poly(ethylene) (K2045, 20 μm thick, porosity 45%, CELGARD ™).

| | Tensile strength (MPa) | |
|---|---|---|
| Sample | Mean | Standard deviation |
| CELGARD ™ K2045 | 98.3 | 10 |
| composite membrane | 84.9 | 2.6 |

Rejection Assessment

Figure 9:
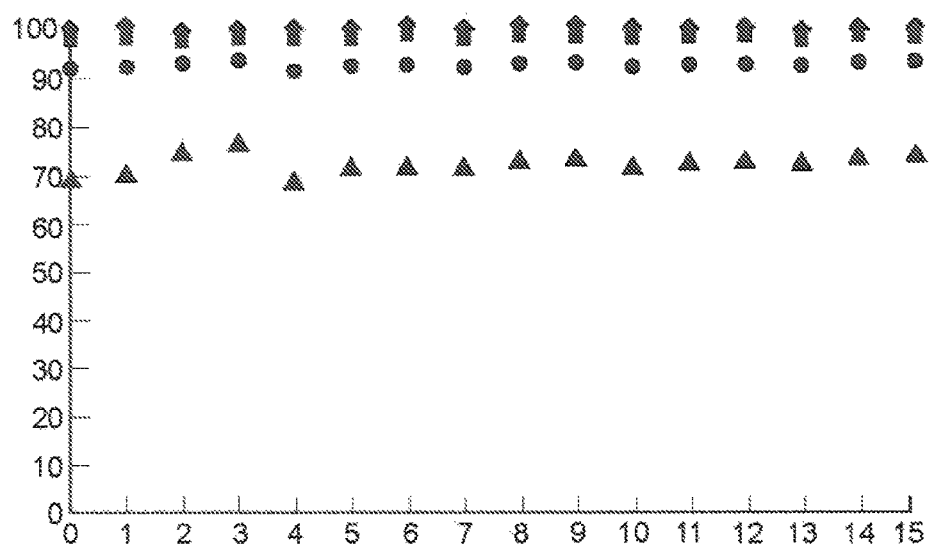
FIG. 9. Graph showing the rejection of fat (solid diamonds), lactose (solid triangles), protein (solid squares) and total solids (crosses) determined for samples of permeate where the feed stream was skim milk at a pressure of 20 bar or 28 bar (third and fourth samples).

Samples of permeate collected from a milk feed stream with periodic in situ cleaning of the membrane were analysed for fat, lactose, protein and total solids content. The results of these analyses are presented in FIG. 9.

In Situ Disinfection of Membrane

Prior to the washing steps the membrane was rinsed by circulating water at an initial temperature of 65° C. through the filter assembly for a period of three minutes before draining the system. The membrane was subjected to a first wash by circulating a circa 2% (w/v) sodium hydroxide solution ("caustic wash") through the filter assembly for a period of five minutes before draining and flushing the system by circulating water at an initial temperature of 65° C. through the filter assembly system for a period of five minutes. The membrane was subjected to a second wash by circulating a circa 2% (w/w) nitric acid solution ("acid wash") through the filter assembly system for a period of ten minutes before draining and flushing the system by circulating water at an initial temperature of 65° C. for a period of ten minutes. The membrane was subjected to a third wash by circulating a 2% (w/w) sodium hypochlorite solution ("disinfection wash") through the filter assembly system for a period of five minutes before draining and flushing the system with circulating water at an initial temperature of 65° C. for a period of ten minutes. The membrane was subjected to a final wash (a "caustic wash") before flushing the system by circulating water at an initial temperature of 65° C. for a period of five minutes before circulating chilled water for a period of five minutes to cool the system. As before all rinsing and washing steps were performed with no pressure recorded on the pressure gauge (8).

Post Disinfection Flux Testing

Figure 10:
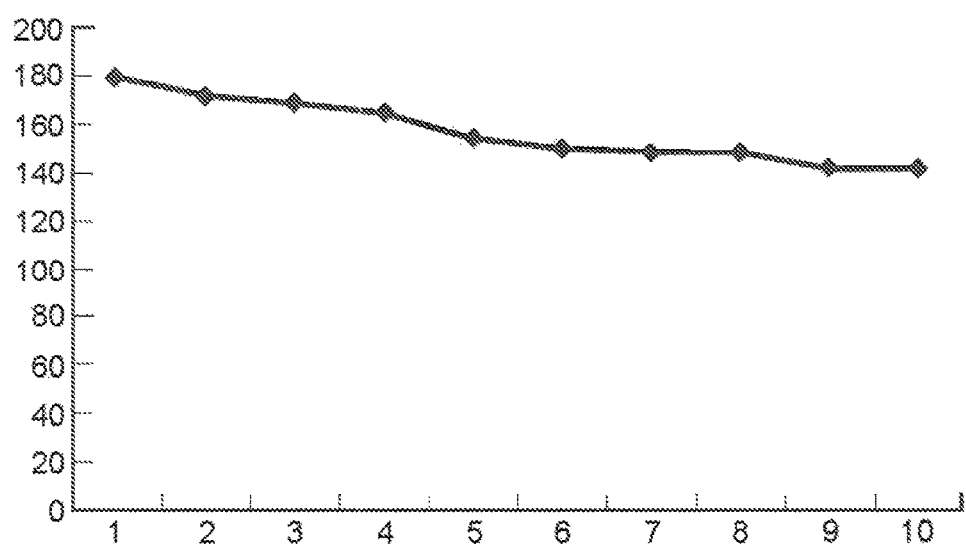
FIG. 10. Flux rates (L/m$^2$h) (Y axis) obtained following disinfection of the asymmetric composite membrane where the feed stream was water at a pressure of 20 bar.
Figure 11:
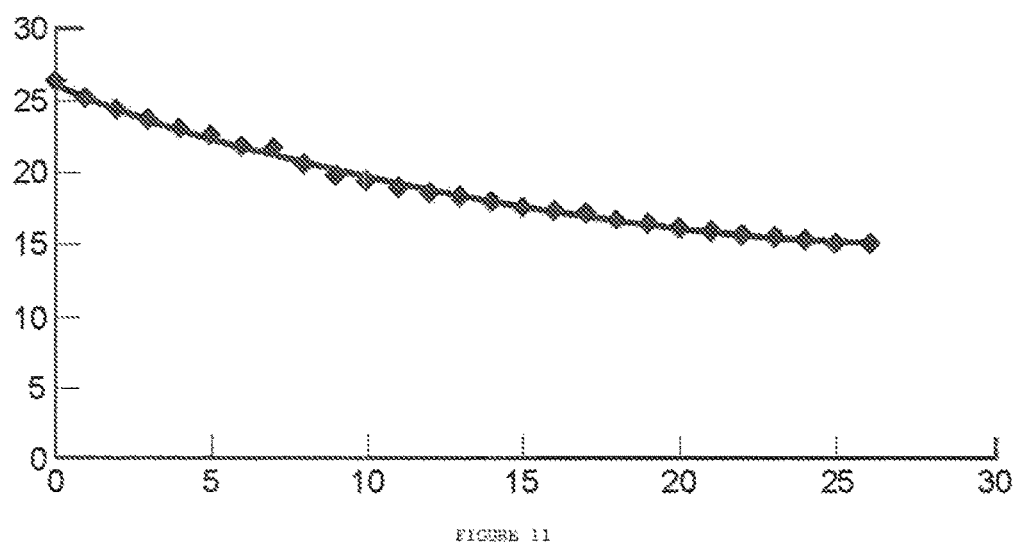
FIG. 11. Flux rates (L/m$^2$h) (Y axis) obtained following disinfection of the asymmetric composite membrane where the feed stream was skim milk at a pressure of 20 bar.

The performance of the asymmetric composite membrane was evaluated following exposure to 2% (w/w) sodium hypochlorite. Flux rates obtained for water as the feed solution at a pressure of 23 bar are provided in FIG. 10. Permeate flux rates obtained when the feed stream was homogenised milk ("blue top") are provided in FIG. 11. Stable flux rates of ca. 15 liters per m$^2$ per hour were obtainable. An operating pressure of 20 bar for a flux rate of 13 liters per m$^2$ per hour was considered optimal for long-term use of the membrane.

Example 11

A section of the asymmetric composite membrane was cut to size and mounted in the assembly illustrated in FIG. 6 as described above. A feed stream of homogenised whole milk (blue top) at a temperature of 7° C. was pumped at a rate (600 rpm) to maintain a feed stream pressure of 20 bar. Collection of permeate was alternated with the following clean-in-place (CIP) protocol:
  Two volumes of two liters tap water at a temperature of 35° C. (flushed for 5 minutes each);
  Circulating sodium hydroxide (pH 12) at a temperature of 35° C. for a period of 10 minutes;
  One volume of one liter of tap water at a temperature of 35° C. (flushed for 5 minutes);
  Circulating hydrochloric acid (pH 1.522) at a temperature of 35° C. for a period of 10 minutes;
  One volume of one liter of tap water at a temperature of 35° C. (flushed for 5 minutes each);
  Circulating sodium hydroxide (pH 12) at a temperature of 35° C. for a period of 10 minutes;
  Two volumes of two liters tap water at a temperature of 35° C. (flushed for 5 minutes each);
  Rinsing with cold tap water for a period of 5 minutes.

Figure 12:
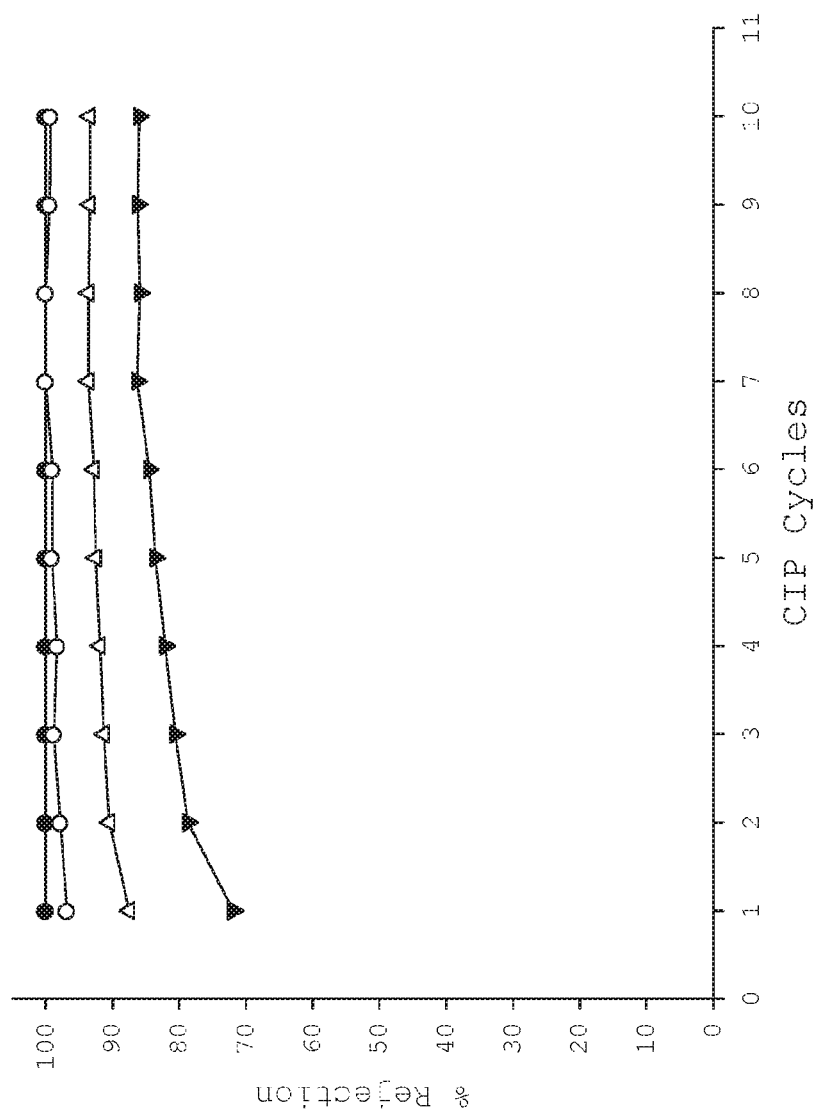
FIG. 12. Graph showing the rejection of fat (solid circles), lactose (solid inverted triangles), protein (open circles) and total solids (open inverted triangles) determined for samples of permeate where the feed stream was whole milk at a pressure of 20 bar and temperature of 7° C.

Ten samples of permeate from the milk feed stream were collected and independently analysed (Livestock Improvements Corporation, Hamilton) for fat, lactose, protein and total solids content. The results of these analyses are presented in FIG. 12. The asymmetric composite membrane provided consistently high rejection of fat, lactose, protein and total solids despite the repeated application of the CIP protocol. The performance of the membrane is consistent with its proposed use in food processing applications.

Although the invention has been described with reference to embodiments or examples it should be appreciated that variations and modifications may be made to these embodiments or examples without departing from the scope of the invention. Where known equivalents exist to specific elements, features or integers, such equivalents are incorporated as if specifically referred to in this specification. In particular, variations and modifications to the embodiments or examples that include elements, features or integers disclosed in and selected from the referenced publications are within the scope of the invention unless specifically disclaimed. The advantages provided by the invention and discussed in the description may be provided in the alternative or in combination in these different embodiments of the invention.

REFERENCED PUBLICATIONS

Anon (2009) *Standard Practice for Cutting Film and Sheeting Test Specimens* (D6287) ASTM International, 100 Barr Harbour Drive, PO Box C700, West Conshohocken, Pa. 19428-2959, United States.

Anon (2010) *Standard Test Method for Tensile Properties of Plastics* (D638) ASTM International, 100 Barr Harbour Drive, PO Box C700, West Conshohocken, Pa. 19428-2959, United States.

Anon (2012) *Standard Test Method for Tensile Properties of Thin Plastic Sheeting* (D882) ASTM International, 100 Barr Harbour Drive, PO Box C700, West Conshohocken, Pa. 19428-2959, United States.

Briggs (2015) *Microporous polyolefin sulfonic acids and methods for their preparation* International application no. PCT/EP2014/066668 [Publ. no. WO 2015/015009 A1].

Deb et al (2007) *Modification of sulfonated poly(ether ether ketone) with phenolic resin* Polym. Adv. Technol. 18, 419-426.

Di Vona et al (2008) *Synthetic strategies for the preparation of proton-conducting hybrid polymers based on PEEK and PPSU for PEM fuel cells* C. R. Chimie, 11, 1074-1081.

Di Vona et al (2009) *Analysis of Temperature-Promoted and Solvent-Assisted Cross-Linking in Sulfonated Poly(ether ether ketone)* (SPEEK) Proton-Conducting Membranes J. Phys. Chem. B 2009, 113, 7505-7512.

Hande et al (2008) *Crosslinking of sulfonated poly (ether ether ketone) using aromatic bis (hydroxyethyl) compound*, J. Membr. Sci., 322, 67-73.

Hirota et al (2010) *Hydrolysis of acetic anhydride: non-adiabatic calorimetric determination of kinetics and heat exchange* Chem. Eng. Sci., 65, 3849-3858.

Hou et al (2012) *Building bridges: Crosslinking of sulfonated aromatic polymers—a review* J. Membr. Sci., 423-424, 113-127.

Loeb (1981) *The Loeb-Sourirajan Membrane: How It Came About* In Synthetic Membranes, ACS Symposium Series, American Chemical Society, Washington, D.C.

McCutcheon and Wang (2013) *Osmotic Processes for a Sustainable 21st Century—Guest Editorial* Desalination, 312, 1.

Merle et al (2014) Friedel Crafts crosslinked highly sulfonated polyether ether ketone (SPEEK) membranes for a vanadium/air redox flow battery, Membranes 4, 1-19.

Mikhailenko et al (2004) Proton conducting membrane based on cross-linked sulfonated poly(ether ether ketone) (SPEEK) J. Membr. Sci. 233, 93-99.

Mikhailenko et al (2006) Properties of PEMs based on crosslinked sulfonated poly(ether ether ketone) J. Membr. Sci. 285, 306-316.

Rhoden et al (2011) Low equivalent weight Friedel-Crafts cross-linked sulfonated poly(ether ether ketone) J. Membr. Sci., 376, 290-301.

Ye et al (2009) Sulfonated poly (ether ether ketone) membranes crosslinked with sulfonic acid containing benzoxazine monomer as proton exchange membranes Polymer, 50, 3196-3203.

The invention claimed is:

1. A method of removing water from a feed stream that is a dairy product comprising the step of exposing the first layer of an asymmetric composite membrane to the feed stream at a pressure and temperature sufficient to produce a permeate, where the asymmetric composite membrane comprising a first layer of cross-linked sulfonated poly(ether ether ketone) adhered to a second layer of sulfonated microporous poly(ethylene).

2. The method of claim 1 where the feed stream is milk.

3. The method of claim 2 where the pressure is in the range 20 to 40 Bar.

4. The method of claim 3 where the temperature is in the range 4 to 20° C.

5. A method of preparing a cross-linked sulfonated poly(ether ether ketone) comprising the step of incubating in the presence of a Friedel-Crafts type catalyst a mixture of a chlorosulfonated poly(ether ether ketone) and a $C_{2-9}$-dioyl halide cross-linking agent solvated in a non-aqueous reactive solvent at a temperature substantially below 180° C. for a period of time sufficient to provide the cross-linked sulfonated poly(ether ether ketone).

6. The method of claim 5 where the Friedel-Crafts type catalyst is ferric chloride ($FeCl_3$).

7. The method of claim 6 where the $C_{2-9}$-dioyl halide is an acyclic, aliphatic $C_{2-6}$-dioyl chloride.

8. The method of claim 7 where the $C_{2-9}$-dioyl halide is butanedioyl dichloride.

9. The method of claim 8 where the non-aqueous reactive solvent is a cycloalkanone.

10. The method of claim 9 where the non-aqueous reactive solvent is cyclopentanone.

11. The method of claim 5 where the temperature is in the range 120° C. to 170° C.

12. The method of claim 5 where the period of time is 15 to 105 minutes.

13. An asymmetric composite membrane comprising a first layer of cross-linked sulfonated poly(ether ether ketone) adhered to a second layer of sulfonated microporous poly(ethylene).

14. The membrane of claim 13 where the thickness of the first layer is in the range 0.1 to 50 µM and the thickness of the second layer is in the range 5 to 200 µM.

15. The membrane of claim 14 where the thickness of the first layer is in the range 1 to 5 µM and the thickness of the second layer is in the range 5 to 20 µM.

16. The membrane of claim 13 where the first layer of cross-linked sulfonated poly(ether ether ketone) is prepared according to a method comprising the step of incubating in the presence of a Friedel-Crafts type catalyst a mixture of a chlorosulfonated poly(ether ether ketone) and a $C_{2-9}$-dioyl halide cross-linking agent solvated in a non-aqueous reactive solvent at a temperature substantially below 180° C. for a period of time sufficient to provide the cross-linked sulfonated poly(ether ether ketone).

* * * * *